United States Patent Office 3,262,933
Patented July 26, 1966

3,262,933
ANTHRAQUINONYL-TRIAZINE DYE
Konrad Mix and Rudolf Klein, Frankfurt am Main, Fechenheim, Germany, assignors to Cassella Farbwerke Mainkur Aktiengesellschaft, Frankfurt am Main, Fechenheim, Germany, a company of Germany
No Drawing. Filed Sept. 9, 1964, Ser. No. 395,310
Claims priority, application Germany, Sept. 25, 1963, C 30,965
1 Claim. (Cl. 260—249)

This invention relates to a new and valuable anthraquinone dye and pigment.

More particularly, this invention relates to a new compound of the formula

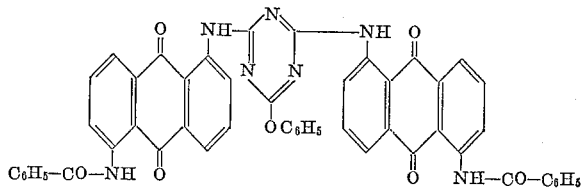

which compound is a golden yellow vat dye and pigment.

The compound of the invention may be prepared by the reaction of 2,4-dichloro-6-phenoxy-1,3,5-triazine with 1-amino-5-benzoylamino-anthraquinone in the molar ratio of 1:2.

The product of our invention is a deep and full brown solid having, in a pure form, a melting point of 373–375° C., which compound dyes cotton an intense golden yellow shade. It is also usable as a golden yellow pigment for dyeing organic material, such as plastics and, in particular, it is suitable in the paint and varnish industry, for the spin dyeing and for the dyeing of man-made fibers, especially those on the basis of polyester when applied in the known thermofixing process.

The dyeings obtained with the dyestuff under our present invention distinguish themselves by their very good fastness properties, in particular their fastness to light, and by a very good resistance to migration of the pigments in the material dyed.

Furthermore, the dyestuff under our present invention is of particular importance for the printing by the so-called flash-ageing method of textile materials consisting of native and regenerated cellulose, by which method the printing paste is only prepared from the dyestuff, the thickening agent, and water while the reducing agent and the alkali are applied by padding only immediately before steaming.

The unexpected difference in the behavior of dyeings obtained with the dyestuff of our present invention, when applied as a vat dye to cotton, over dyeings obtained with 2,4-di(anthraquinonyl-1′-amino)-6-phenoxy-1,3,5-triazine known from U.S. Patent 3,040,045 involves a significant technical advantage. Since dyeings obtained with the known dyestuff show, after their usual exposure to light, a considerable tendering of the fibrous material dyed, it is surprising that said tendering does not occur when the dye under our invention is employed.

Our invention can be illustrated by the following example in which parts are by weight unless otherwise specified and temperatures given are in degrees centigrade.

Example 24 parts 2,4-dichloro-6-phenoxy-1,3,5-triazine having a melting point of 113–114° are admixed, at 130°, with an anhydrous solution of 68 parts 1-amino-5-benzoylamino-anthraquinone in 800 parts by volume nitrobenzene. Subsequently, the reaction mixture is stirred for 3 hours at 150°, and for a further 3 hours at 200°. The mixture is cooled down, the reaction product that has separated is sucked off, washed with nitrobenzene, hot o-dichlorobenzene, and alcohol, and dried. Thus, 75 parts 2-phenoxy-4,6-di-(5′ - benzoylamino-anthraquinonyl-1′-amino)-1,3,5-triazine in the form of brown crystals having a melting point of 373–375° are obtained. Yield: 88% of the theoretical.

The dyestuff obtained dissolves in concentrated sulfuric acid with a yellow color and is insoluble in the usual organic solvents. When applied according to the so-called flash ageing method, it yields a clear, golden yellow print of very good fastness properties, having in particular an excellent fastness to boiling with sodium carbonate.

We claim:
The compound of the formula

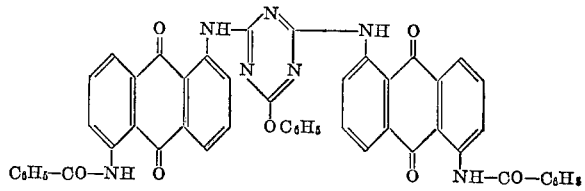

References Cited by the Examiner

UNITED STATES PATENTS
2,832,779   4/1958   Ebel et al. _____ 260—249 X

FOREIGN PATENTS
926,976   4/1955   Germany.

WALTER A. MODANCE, Primary Examiner.
JOHN M. FORD, Assistant Examiner.